(12) United States Patent
Mouton et al.

(10) Patent No.: US 10,472,962 B2
(45) Date of Patent: Nov. 12, 2019

(54) DEVICE AND METHOD FOR THE AUTOMATED PICKING UP AND LAYING OF A SEGMENT TO FORM A LINING OF A TUNNEL

(71) Applicant: BOUYGUES TRAVAUX PUBLICS, Guyancourt (FR)

(72) Inventors: Lucas Mouton, Versailles (FR); Nicolas Demuynck, Marcoussis (FR)

(73) Assignee: BOUYGUES TRAVAUX PUBLICS, Guyancourt (FR)

( * ) Notice: Subject to any disclaimer, the term of this patent is extended or adjusted under 35 U.S.C. 154(b) by 0 days.

(21) Appl. No.: 16/338,981

(22) PCT Filed: Oct. 3, 2017

(86) PCT No.: PCT/FR2017/052719
§ 371 (c)(1),
(2) Date: Apr. 2, 2019

(87) PCT Pub. No.: WO2018/065726
PCT Pub. Date: Apr. 12, 2018

(65) Prior Publication Data
US 2019/0234214 A1 Aug. 1, 2019

(30) Foreign Application Priority Data
Oct. 4, 2016 (FR) ..................... 16 59588

(51) Int. Cl.
*E21D 11/40* (2006.01)
*E21D 9/00* (2006.01)
*G01B 11/30* (2006.01)

(52) U.S. Cl.
CPC ............ *E21D 11/403* (2013.01); *E21D 9/003* (2013.01); *G01B 11/306* (2013.01)

(58) Field of Classification Search
CPC ....... E21D 11/403; E21D 9/003; G01B 11/30; G01B 11/303; G01B 11/306
See application file for complete search history.

(56) References Cited

U.S. PATENT DOCUMENTS

| 2014/0207411 A1* | 7/2014 | Laurent | G01B 11/30 |
| | | | 702/159 |
| 2015/0308268 A1* | 10/2015 | Okada | E21D 11/40 |
| | | | 701/50 |

FOREIGN PATENT DOCUMENTS

EP 0791725 A1 * 8/1997 ............. E21D 9/003

* cited by examiner

*Primary Examiner* — Tara Mayo-Pinnock
(74) *Attorney, Agent, or Firm* — Womble Bond Dickinson (US) LLP

(57) ABSTRACT

The invention relates to a device for the automated picking up and placing of a segment forming the lining of a tunnel, intended to be coupled to a tunnel-boring machine (1) provided with a segment erector (2), comprising:—a controller designed to communicate with an automated system of the tunnel boring machine, suitable for controlling the actuation of the erector; and—a three-dimensional vision system comprising at least four laser profilometers; the controller is designed to receive a segment positioning plan and to determine, from the analysis data of the three-dimensional vision system, the measurement data of the erector sensors and the segment positioning plan, an erector trajectory for positioning the segment (V) to be placed in alignment with a segment and/or ring (A) of segments already placed, and to communicate movement commands to the automated system of the tunnel boring machine, for actuating the erector to pick up the segment to be placed and move it according to the above trajectory.

11 Claims, 3 Drawing Sheets

DEVICE AND METHOD FOR THE AUTOMATED PICKING UP AND LAYING OF A SEGMENT TO FORM A LINING OF A TUNNEL

FIELD OF THE INVENTION

The present invention relates to a device for the automated picking up and laying of a segment intended to be coupled to a tunnel-boring machine provided with a segment erector, as well as to a method for the automated picking up and laying of segments implementing such a device.

BACKGROUND OF THE INVENTION

The lining of a tunnel generally consists of prefabricated segments (voussoirs) arranged in the form of a plurality of successive rings.

As the tunnel-boring machine advances, a new ring is constructed by successively assembling a plurality of segments against a previously laid ring.

The front face of each new ring (that is to say, the face oriented towards the cutting head of the tunnel-boring machine) serves as a bearing surface for thrust cylinders located at the rear of the tunnel-boring machine shield (that is to say on the opposite side to the cutting head) and intended to exert the thrust necessary to dig the excavated ground.

The laying of the segments is carried out by an erector, that is to say a machine allowing the gripping of a segment from a magazine arranged at the rear of the tunnel-boring machine shield, then its displacement towards its intended location for form the ring. The erector is a component of the tunnel-boring machine shield, located at the rear thereof.

At present, the erector is generally controlled by an operator in the immediate vicinity thereof, in the area in which the segments are laid.

However, this driving by an operator has several disadvantages.

On the one hand, the presence of one or several operator(s) in the segment laying area presents a risk for their safety.

On the other hand, the laying time for each segment is high, especially because one or several operator(s) control(s) the position of a segment placed relative to the segments previously laid, and because the possible position adjustments are carried out empirically by said operator(s). This task is also particularly difficult since it imposes multiple displacements to the operator.

It would therefore be desirable to be able to automate the laying of the segments in order, on the one hand, to avoid the presence of operators in the laying area and, on the other hand, to improve the quality and time of the segment laying.

As the erector is a hydraulic machine of great capacity and great range, with operatively important arrows, its positioning is not accurate and repeatable. These defects are accentuated by the high degree of wear and the significant increase in the operating clearances over the service life of the tunnel-boring machine.

Document FR 2 745 327 describes a device for assisting an operator during the laying of segments in a tunnel. This device implements a measuring sensor designed to measure the position of a reference point on a lateral face of a segment previously laid and a reference point on a lateral face of the segment to be laid, these two reference points being to be placed opposite each other. This device further comprises a calculator configured to determine, from the analysis of the deviations in these two reference points, the path of the erector to bring the segment to be laid up into the desired position relative to the segment previously laid.

As a first step, the operator controls the erector to bring it approximately into a position close to that of the segment previously laid. The measuring sensor is placed so that the segment to be laid and the segment previously laid are within its field of vision. The analysis of the deviations in the reference points is then carried out and transmitted to the calculator.

The calculator then calculates the displacement of the erector necessary to bring the segment to be laid into its final position. In this phase, the erector is automatically driven according to the displacement defined by the calculator, without intervention of the operator.

However, this device does not allow fully automating the laying of the segment, the approximate placement remaining performed by an operator. In addition, this device does not allow controlling the quality of laying of the segment (said quality to be considered according to different degrees of freedom). In addition, the measuring sensor is specific to the erector so as to be able to follow it.

Document CN104747213 describes a device for the automated laying of segments. This device comprises two three-dimensional cameras intended to acquire images of a face of the segment to be laid and of the face of a segment previously laid intended to be placed in contact with each other during the laying of the segment. This device further comprises a calculator for analyzing said images to determine an offset between said segments.

As a first step, the segment to be laid is brought into an approximate position compared to a segment previously laid.

As a second step, the cameras acquire images of the faces of the segments intended to be placed vis-à-vis one another.

These images are transmitted to the calculator that processes them to deduce therefrom an offset between the two segments defined on the one hand by the distance between the faces vis-à-vis the two segments and the distance between the front faces of the two segments. If this offset is less than a determined threshold, the segment is considered as correctly positioned and the method for laying said segment is completed. If this offset exceeds said threshold, the calculator determines the movements of the erector necessary to improve the segment positioning accuracy, and the erector is automatically controlled to perform said movements. This procedure can possibly be iterated until the offset between the two segments is below the determined threshold.

However, the times for processing such images are relatively long, which penalizes the time for laying each segment. In addition, this device does not take into account any possible angular offset of the segment to be laid relative to the segment previously laid.

Document JPH08-296400 describes an erector allowing the automated laying of segments comprising a vision sensor consisting of two cameras, one of which has a field of vision greater than that of the other.

As a first step, the segment to be laid is brought into an approximate position relative to a segment previously laid.

A laser projector projects a line of light on the faces intended to be in contact with the segment previously laid and the segment to be laid. The cameras acquire images of said line of light. These images are transmitted to the calculator which processes them to deduce therefrom an offset between the two segments, this offset being defined in position (distances in three directions) and in inclination (angles in three directions). The calculator determines the movements of the erector needed to align the two segments, and the erector is automatically controlled to perform said movements.

However, the erector described in this document has been designed specifically and the automation it provides is therefore not adaptable to an existing erector of a tunnel-boring machine of the market.

Finally, none of the aforementioned documents mentions the placement of the first segment or that of the key (last segment allowing to close the ring in the case of a universal ring), which has a more important complexity of placement.

BRIEF DESCRIPTION OF THE INVENTION

One object of the invention is to design a device for the automated laying of a segment that allows increasing the safety of the operators and the productivity by minimizing the intervention of an operator, minimizing the time for laying each segment and by improving the laying accuracy. This device must allow the laying of a complete ring, including the first and the last segment constituting the ring, whether it is a universal ring or not. Furthermore, said device must be compatible with an erector of a tunnel-boring machine of the market. Finally, said device must be compact and easy to install.

According to the invention, there is proposed a device for the automated picking up and laying of a segment forming the lining of a tunnel, intended to be coupled to a tunnel-boring machine provided with a segment erector, said erector comprising actuators equipped with position sensors, characterized in that it comprises:
 a controller configured to communicate with an automated system of the tunnel-boring machine adapted to control the actuation of the erector, and to receive measurement data from the erector sensors,
 a three-dimensional vision system comprising at least four laser profilometers, intended to be attached to the erector so as to (i) determine a deviation in position and in inclination between the erector and a segment to be gripped and (ii) acquire the set of data analyzing the deviations in the position and inclination of a segment to be laid which is held by the erector relative to at least one segment and/or one ring of segments previously laid, said three-dimensional vision system being coupled to the controller to transmit said measurement data thereto,
 the controller being configured to receive a segment laying plan and, thanks to a computer planner adapted to process said analysis data of the three-dimensional vision system, the measurement data of the erector sensors and said laying plan, to determine a path of the erector in order to place said segment to be laid opposite said segment and/or ring of segments previously laid, and to communicate movement orders to the automated system of the tunnel-boring machine in order to actuate the erector to pick up the segment to be laid and displace it according to said path.

Advantageously, the device further comprises a man-machine interface coupled to the controller.

According to one embodiment, the controller is configured to send, to the automated system of the tunnel-boring machine, orders to move at least one thrust cylinder of the tunnel-boring machine, to release an area for laying the segment to be laid and to secure said segment once it is in place.

According to an advantageous embodiment, the controller is configured to recognize, from the measurement data, a segment to be laid.

Another object of the invention is a tunnel-boring machine incorporating a segment erector and a device as described above.

Another object relates to a method for the automated picking up and laying of a segment to form the lining of a tunnel, by a tunnel-boring machine provided with a segment erector and with an automated system adapted to control the actuation of the erector, characterized in that it comprises:
 providing a device as described above,
 placing the three-dimensional vision system on the erector,
 establishing a communication between the controller of said device and the automated system of the tunnel-boring machine,
 receiving, by the controller, a segment laying plan and measurement data from the sensors of the erector,
 communicating, by the controller to the automated system of the tunnel-boring machine, an order to grip the segment to be laid by the erector,
 gripping a segment to be laid by the erector,
 bringing said segment into a laying area defined by the controller,
 acquiring, by the three-dimensional vision system, data analyzing the deviations in the position and inclination of the segment to be laid relative to at least one segment and/or one ring of segments previously laid,
 processing said measurement data by the controller to determine, from said measurement data of the three-dimensional vision system, measurement data of the erector sensors and of said laying plan, a path of the erector in order to place said segment to be laid opposite said segment and/or ring of segments previously laid,
 communicating, by the controller, orders to move the erector to the automated system of the tunnel-boring machine,
 actuating the erector by the automated system according to said movement orders, to place the segment,
 communicating to the automated system, by the controller, orders to move at least one thrust cylinder of the tunnel-boring machine;
 securing said segment by said thrust cylinder against a ring previously laid.

According to one embodiment, said method further comprises, prior to the gripping of the segment to be laid, the recognition of said segment by the controller from the data provided by the three-dimensional vision system.

According to one embodiment, after the securing operation of the segment, the controller sends, to the automated system of the tunnel-boring machine, an order to release the gripping of the segment.

In a particularly advantageous manner, said method allows the automated laying of a complete ring of segments, said method being implemented for the set of segments constituting said ring.

According to one embodiment, the method further comprises, after the placement of a complete ring of segments, the measurement, by the three-dimensional vision system, of at least one geometric characteristic of said ring, comprising the roll angle, the flatness of the front face, the centering of the ring in the skirt of the tunnel-boring machine and/or the ovalization of the ring.

According to a preferred embodiment, according to said measurement of said geometrical characteristic of the ring, the controller adjusts the plan for laying the segments of the next ring.

BRIEF DESCRIPTION OF THE DRAWINGS

Other characteristics and advantages of the invention will become apparent from the following detailed description, with reference to the appended drawings in which.

DETAILED DESCRIPTION OF THE INVENTION

Figure 1:
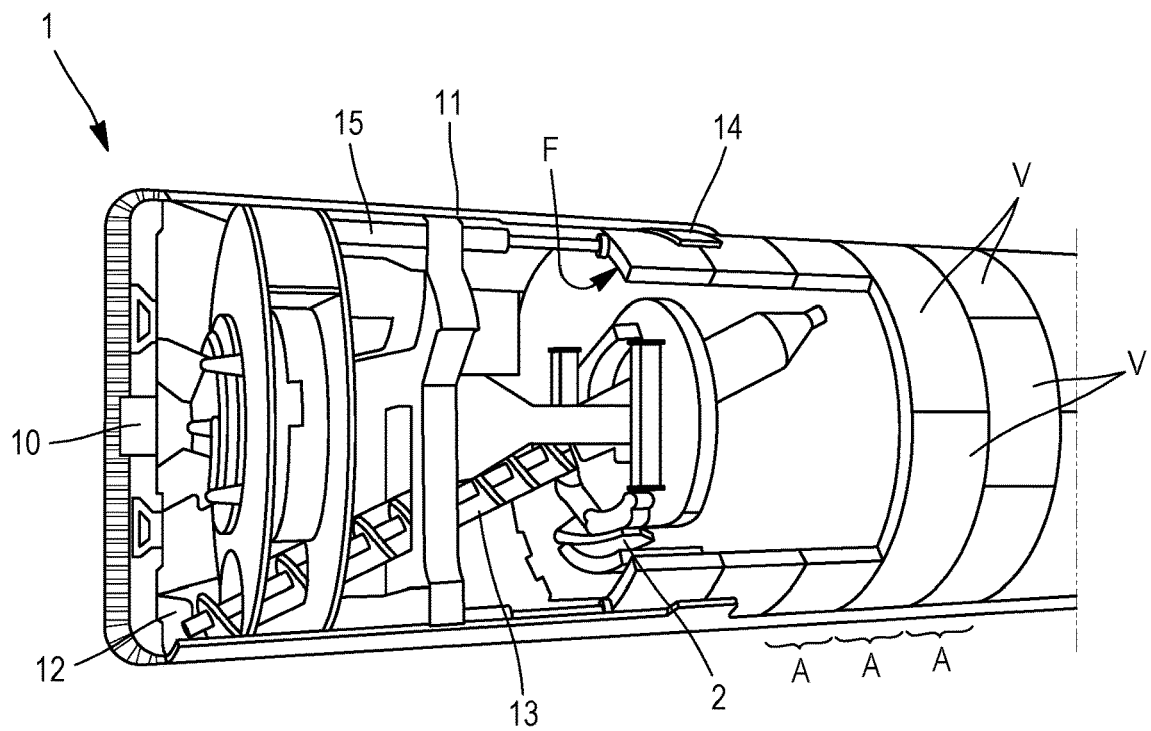
FIG. 1 is an overall view of the rear part of a tunnel-boring machine shield.

FIG. 1 is a partial cross-sectional overall view of the rear part of a tunnel-boring machine shield for which the invention is likely to be implemented, being specified that the invention is not limited in terms of type of tunnel-boring machine (earth-pressure tunnel-boring machine, mud-pressure tunnel-boring machine, etc.).

In a manner known per se, the tunnel-boring machine 1 comprises, in its front part, a rotary cutting head 10 and provided with cutting tools, intended for the felling of the ground.

The cutting head 10 is fixed to the front of a shield 11 which provides protection and sealing of the excavation work.

A felling chamber 12 in which the cuttings from the cutting front are transferred is at the rear of the cutting head 10.

The cuttings can be discharged from the felling chamber by means of a discharge screw 13, at the outlet of which they are deposited on a conveyor in order to be evacuated. According to the type of the tunnel-boring machine, the discharge means may vary and are not limited to the represented screw.

In its rear part, the shield 11 has a skirt 14 under which the segments V forming the lining of the tunnel are placed.

The tunnel-boring machine 1 is provided with thrust cylinders 15 which bear on the front face F of the last ring A of laid segments, said cylinders 15 being intended to exert on the cutting head 10 a thrust force forward during the felling phase.

In order to place the segments V, a segment erector 2 is arranged in the shield, protected from the skirt 14.

The erector 2 is fed with segments from the outside of the tunnel-boring machine by a conveyor system (not represented).

Figure 2:
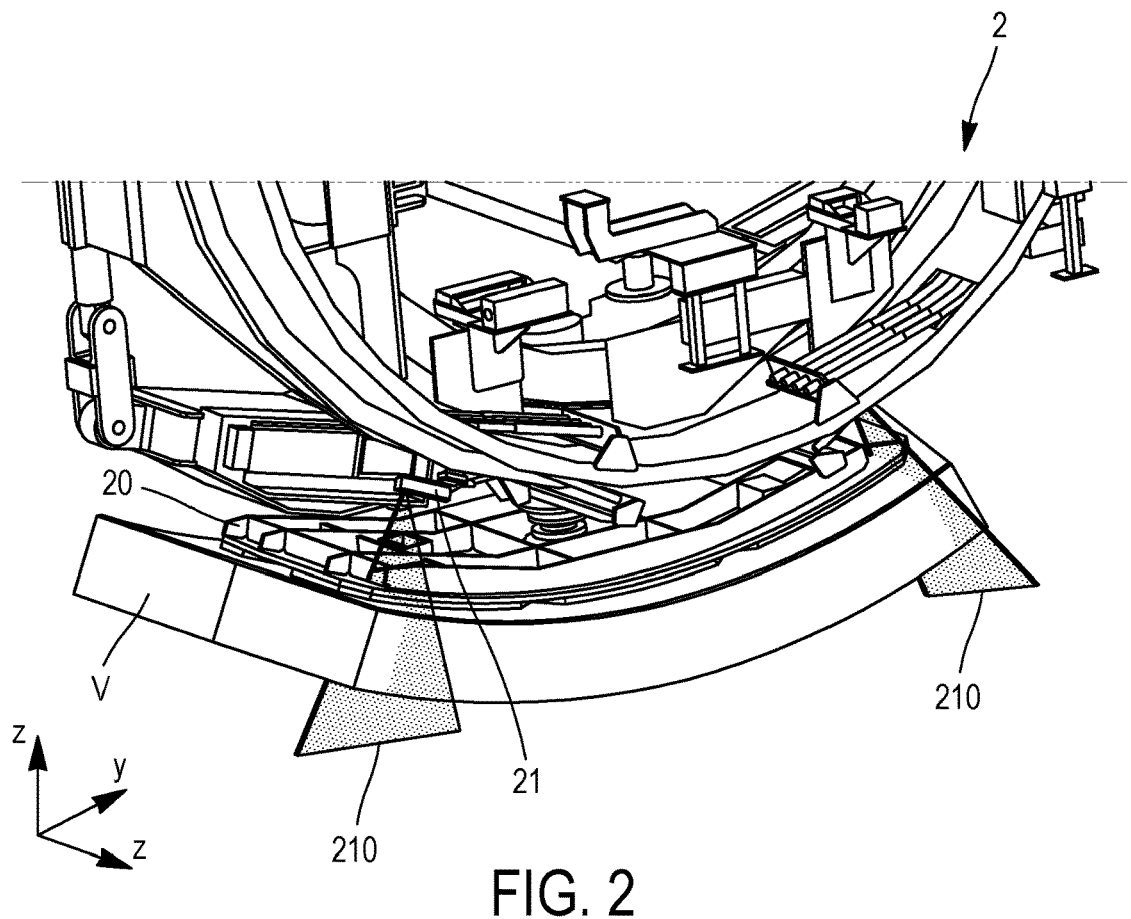
FIG. 2 illustrates an erector carrying a segment facing ring of segments previously laid.

As seen more clearly in FIG. 2, the segment erector 2 comprises a gripping device 20 having a shape which is substantially complementary to the interior of the segments V. Preferably, the gripping is performed by negative pressure (sucker effect generated by suction), so that no tools or special handling is necessary to hold the segments on the erector. In an alternative manner (not represented), the erector may be provided with gripping members able to pass through orifices arranged in the segments.

The erector is provided with a number of actuators (including cylinders and motors) providing at least six degrees of freedom in rotation and in translation to the gripping device and allowing a large number of movements. More specifically, the erector comprises a rotor and cylinders arranged between the rotor and the gripping device.

The erector can operate at a relatively high speed, in an approach phase (coarse positioning) of the segment vis-à-vis the intended laying area, and at a relatively slow speed in an accurate positioning phase.

For the implementation of the invention, the actuators of the erector are instrumented by any type of sensor (for example, cylinder elongation sensors, encoders in rotation of the motors, etc.) so that it is possible to know at any time the position of the gripping device relative to a reference position, according to each degree of freedom. As indicated above, the position information provided by these sensors are only theoretical insofar as they do not take into account the arrows, operating clearances, etc. of the various components of the erector, which can be significant. It is therefore not possible to rely only on this information to position a segment accurately. The invention overcomes this disadvantage by equipping the erector with a three-dimensional vision system that assists the gripping and then the accurate placement of the segments.

An automated system of the tunnel-boring machine makes it possible to control the actuation of the erector by driving the various actuators to move the gripping device along a determined path. In a conventional tunnel-boring machine, this path is defined by an operator. Thanks to the invention, said path is determined by a controller and a planner which will be described in detail below. However, an operating mode in which an operator controls the automated system remains available when necessary.

It should be noted that, apart from the fact that the actuators of the erector are previously instrumented, the placement of the three-dimensional vision system on the erector and an adaptation of the automated system to accept an interface with the aforementioned controller, the invention does not require modifying the erector or other elements of the tunnel-boring machine. In other words, the invention applies to any tunnel-boring machine and to any existing segment erector.

The three-dimensional vision system comprises at least four laser profilometers. Each profilometer comprises a laser able to project a laser line towards an object (in this case, a segment to be laid and at least part of the laying area, including a segment previously laid and/or a ring of segments previously laid) and a device for acquiring the profile of the object. The lines of the various profilometers are projected so as to determine sections of the segment and of its environment separate from each other in order to deduce therefrom the position of the segment in space.

More precisely, the four profilometers are used simultaneously during the gripping of a new segment to be laid, as well as for the laying of the last segment of a ring. The two profilometers oriented towards the ring A previously laid allow determining a deviation in position and in orientation of the segment to be laid relative to the previous ring. One of the two profilometers oriented towards the ring when it is being laid allows fine adjustment in position and in orientation of the segment to be laid to form the ring.

Figure 4:
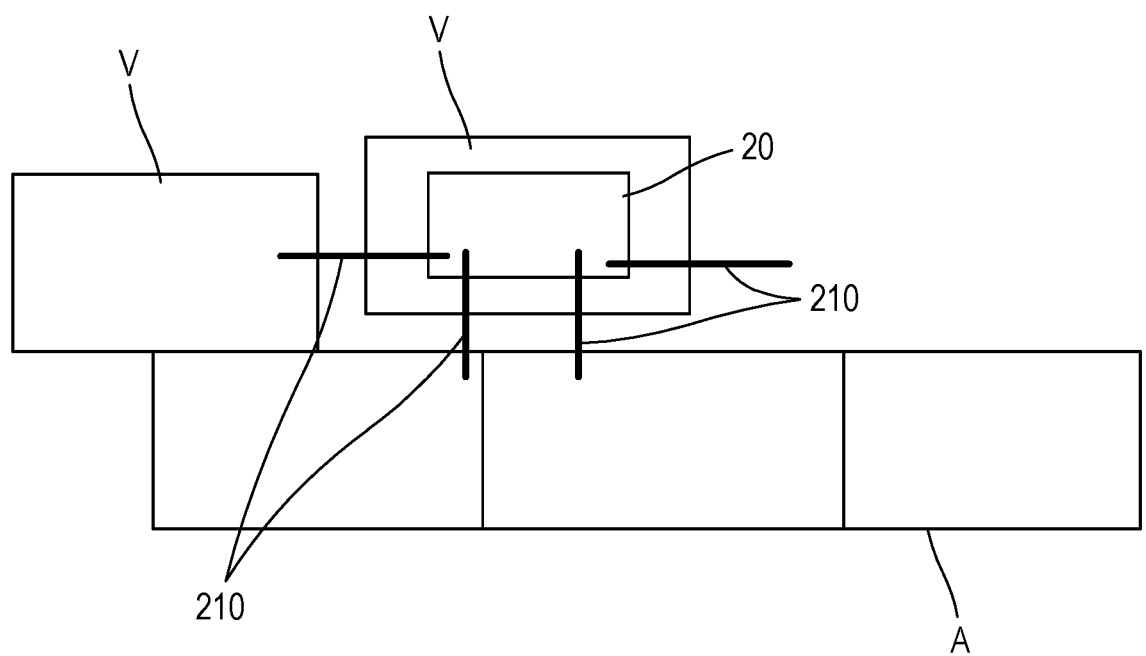
FIG. 4 is a block diagram of the three-dimensional vision system.

For this purpose, as illustrated in FIG. 4, two profilometers (whose laser line 210 is schematized) are oriented towards the ring A consisting of segments V, which is previously laid, and two other profilometers (whose laser line 210 is also schematized) are oriented substantially perpendicular to the two first ones.

The profilometers are chosen with a range of operation adapted to the relative possible displacement of the segment relative to its environment during the approach phase. On the other hand, the resolution of the profilometers is chosen according to the desired accuracy for the collected information—typically a resolution of less than 1 mm is chosen. Finally, the profilometers are chosen with a very high acquisition frequency in order to allow the lowest possible processing time.

Each profilometer provides a local piece of information, but the set of the profilometers provides a global piece of information through a layer of software intelligence; and operated by the controller, allowing to interpret the combined measurements of the profilometers.

According to one embodiment, the profilometers are secured to the rotor.

FIG. 2 illustrates, by way of example, two profilometers 21 (only one is visible) arranged on the erector 2 at a distance from the gripping device 20. The laser lines emitted by each of the profilometers are schematized according to the coordinate system 210. An orthonormal coordinate system X, Y, Z has been represented. Conventionally, the X-axis is the longitudinal axis of the tunnel, the Y-axis extends in the direction of the width of the tunnel and the Z-axis extends in the direction of the tunnel height. The roll angle is defined about the X-axis, the pitch angle is defined about the Y-axis and the yaw angle is defined about the Z-axis.

Compared to three-dimensional vision cameras, the laser profilometers have the advantage of requiring shorter processing to determine the position and inclination of an object.

The device further comprises a processor configured to receive measurement data from the three-dimensional vision system (typically, a profile of the segment and its environment in an X, Z plan) and to process these data so as to determine a deviation in position and in inclination of the segment to be laid relative to at least one segment and/or one ring of segments previously laid.

The device also comprises a controller configured to communicate with said processor and to receive a segment laying plan. Such a laying plan comprises information on the type of segment to be laid, on an intended location for each segment and on a sequence of laying said segments.

Advantageously, the device also comprises a computer planner adapted to communicate with the controller (the planner can possibly be integrated to the controller) and configured to determine, from the measurement data of the erector sensors and, where appropriate, and from the analysis data of the three-dimensional vision system, a path of the erector towards a final position defined by the segment laying plan.

The gripping and the laying of a segment comprise four successive phases that use or do not use the three-dimensional vision system:
  in a first phase (gripping of a new segment to be laid), the three-dimensional vision system is activated to determine a deviation in position and in orientation of the erector relative to a segment to be picked up;
  in a second phase, called blind phase (i.e. not involving the three-dimensional vision system), the planner defines the path of the erector toward an intermediate position determined from the laying plan, in the vicinity of the ring previously laid;
  in a third phase, which implements the three-dimensional vision system, the segment is placed in the location determined by the laying plan;
  in a fourth, blind phase, the planner defines a return path of the erector toward a new segment to be picked up.

In general, the laying plan is transmitted to the automated system of the tunnel-boring machine and validated by an operator by means of a man-machine interface. Alternatively, the laying plan can be transmitted to the controller via a man-machine interface of the device according to the invention. Said man-machine interface will be described in detail below.

The controller is further configured to receive the position information provided by the various erector position sensors, either directly or via the automated system of the tunnel-boring machine.

From the laying plan, the data analyzing deviations in position and in inclination and the erector position information, the controller implements a calculation algorithm (movement generator or planner) allowing to determine a set of displacements of the erector gripping device in the space for bringing the segment to be laid to the required location with an optimal position and orientation accuracy, and transmits, to the automated system of the tunnel-boring machine, orders to move the erector.

Optionally, the placement of the segment can be carried out iteratively, for example by successively adjusting the position of the segment according to the different degrees of freedom. At each step of the iteration, the three-dimensional vision system allows determining a new position and a new inclination of the segment to be laid relative to its environment, and the controller determines a new set of displacements to adjust its positioning.

By way of indication, the accuracy obtained with the invention is in the order of 1 mm, whereas a driving of the erector by a remote control actuated by an operator provides accuracy in the order of 2 to 3mm at best. However, the advantages provided by the invention are not limited to an increase in the accuracy as such but allow optimizing the laying speed-accuracy compromise and increasing the repeatability and reliability of the laying compared to a driving of the erector by an operator.

The man-machine interface is designed to allow an operator, in general, to monitor and control the operation of the automated laying device. Thus, the man-machine interface allows initiating a segment laying sequence, defining the operating modes of the device (for example: fully automatic, semi-automatic operating, etc.), collecting operating information, and troubleshooting the device in case of alarm.

The man-machine interface is also configured to disable, if necessary (for example in the case of an incident), the automated laying device and to allow an operator to directly drive the erector by means of a remote control conventionally used in existing tunnel-boring machines. For this purpose, the man-machine interface comprises an emergency stop button.

Figure 3:
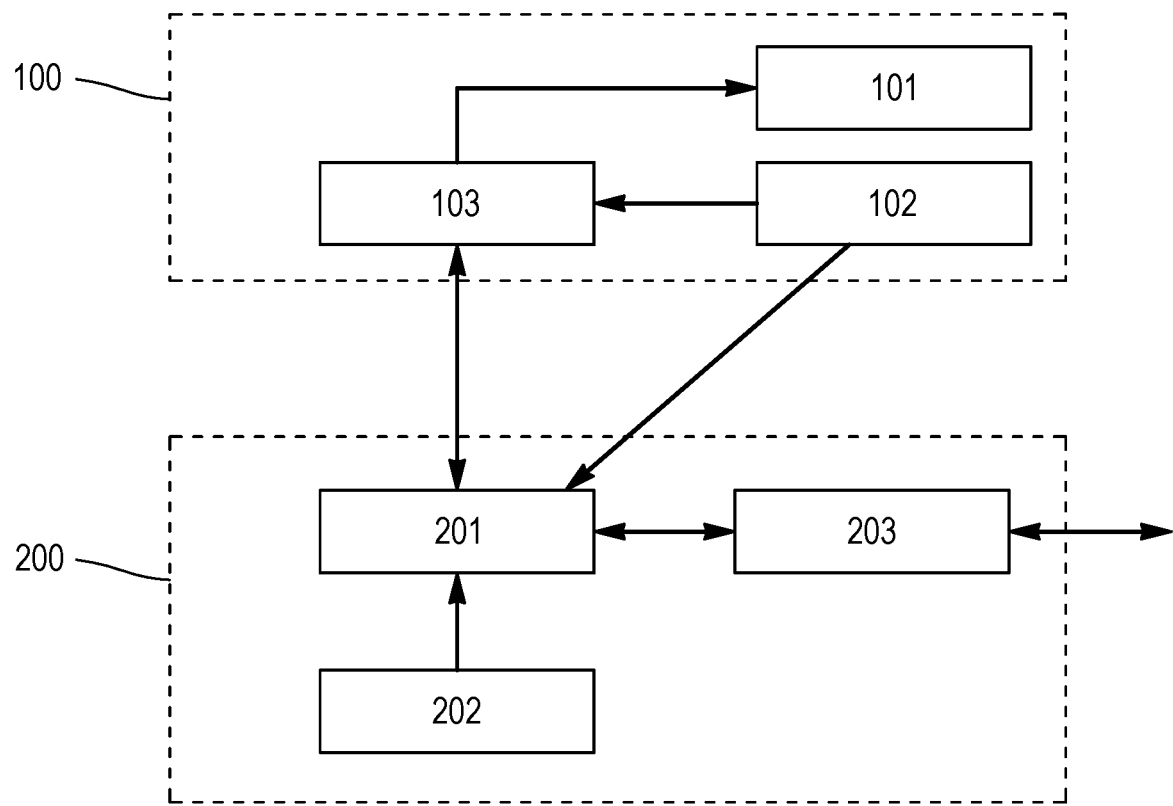
FIG. 3 is an operating chart of the automated laying device according to the invention and its interface with a tunnel-boring machine.

FIG. 3 is an operating chart of the device and of its interface with the tunnel-boring machine.

The tunnel-boring machine is schematized by the block 100.

The block 101 represents the actuators of the segment erector.

The block 102 represents the erector position sensors.

The tunnel-boring machine comprises in particular an automated system 103 for actuating the erector. For this purpose, the automated system 103 receives measurement data from the erector position sensors 102. The automated system 103 controls the actuators 101 of the erector in order to reach a given position of the gripping device.

The device according to the invention is schematized by the block 200.

The block 201 represents the controller, the block 202 represents the three-dimensional vision system and the block 203 represents the man-machine interface.

Furthermore, the controller 201 can transmit, to the man-machine interface 203, a laying report with a view to its edition and/or storage.

The controller 201 receives measurement data from the three-dimensional vision system 202 which is attached to the erector. Via the automated system 103 of the tunnel-boring machine, the controller 201 further receives the measurement data from the sensors 102 of the erector and deduces therefrom a theoretical position of the erector. Alternatively, to avoid latency due to interrogation of the automated system, the controller can communicate directly with the sensors 102.

From the laying plan, the measurement data of the erector sensors and the data analyzing the deviations of the three-dimensional vision system, the controller 201 determines a path of the erector to place a segment to be laid opposite a segment and/or a ring of segments previously laid, and communicates movement orders to the automated system 103 of the tunnel-boring machine to actuate the erector in order to pick up the segment to be laid and displace it along said path.

Particularly advantageously, the device further comprises a safety device (not represented), for example a non-physical barrier which disables the device if an operator bursts into the working area of the erector.

The operation of the device is as follows.

A laying plan is transmitted to the controller.

In a manner known per se, a segment to be laid is placed in the vicinity of the erector.

In a particularly advantageous manner, recognition of said segment can be implemented by the device. Indeed, the set of segments intended to form a ring are not necessarily identical, in particular on the universal ring, and in all cases on the last segment (key) and the adjacent segments (counter-key) which generally have more important reliefs than the other segments.

For this purpose, the three-dimensional vision system is activated so as to acquire a three-dimensional profile of the segment. This profile is compared by the controller to a reference profile included in the laying plan.

Alternatively, the recognition of the segment to be laid can be performed by any other means available to the person skilled in the art, such as a reader adapted to read a bar code or a matrix code affixed to each segment. The read code is compared by the controller to a reference code included in the laying plan.

If the controller detects that the segment presented is not the segment to be laid according to the laying plan, it emits an alert. A change of segment then can be done and the recognition procedure can start again with the replacement segment.

If the controller detects that the segment presented is the segment to be laid, it sends, to the automated system of tunnel-boring machine, orders to move the erector in order to pick up the segment to be laid. The automated system then activates the actuators of the erector to place the gripping device opposite the segment and actuates the gripping (for example by generating a negative pressure providing a sucker effect) to secure the segment to be laid to the gripping device. In the gripping phase, the three-dimensional vision system allows the correct positioning of the gripping device relative to the segment, the controller can determine the position and inclination of the segment to be laid relative to the gripping device.

Note that, although advantageous, this recognition of the segment to be laid is only optional. Alternatively, it can be provided that the controller sends, to the automated system of the tunnel-boring machine, orders to move the erector to grip the segment presented without having previously verified the conformity of said segment, this verification being performed by an operator upstream of the supply chain from the segment to the erector.

In order to release the area intended for the laying of the segment, the controller sends, to the automated system of the tunnel-boring machine, an order to move the one or more thrust cylinder(s) bearing in this area against the last ring.

Once the segment is gripped by the erector, the controller sends, to the automated system of the tunnel-boring machine, orders to move the erector in order to bring the segment approximately to the intended location. For this purpose, the controller uses the erector position information and the laying plan. In this coarse approach phase, a safety distance of the erector and of the segment vis-à-vis the environment of the final position of the segment is observed, so as not to risk a collision. As indicated above, this displacement phase implements the planner, the three-dimensional vision system not being used.

Once this approximate position is reached, the three-dimensional vision system is activated to acquire data measuring the position and inclination of the segment to be laid relative to its final environment, that is to say a ring previously laid and/or a segment previously laid. This measurement data allows accurately determining the deviation between the segment and the reference frame constituted by this final environment. This deviation is characterized by translational distances (for example along three axes X, Y, Z of an orthonormal coordinate system) and by rotational angles (for example roll, pitch and yaw).

From this deviation, the controller determines a set of displacements of the erector gripping device in space allowing to bring the segment to be laid to the required location. This determination combines the erector position information and the data analyzing the deviations of the three-dimensional vision system.

The controller therefore transmits, to the automated system of the tunnel-boring machine, orders to move the erector.

Once the segment is placed, the controller sends, to the automated system of the tunnel-boring machine, orders to move a thrust cylinder in order to secure the segment.

The controller then sends to the automated system of the tunnel-boring machine an order to separate the segment vis-à-vis the erector gripping device, for example an order to release the negative pressure exerted if the segment is maintained on the gripping device by sucker effect. It should be noted that the safety of the gripping system is not affected by the device according to the invention, it remains ensured by the automated system of the tunnel-boring machine that executes the securing operation only if the safety conditions are fulfilled.

The erector is then returned to a rest position before the placement of a new segment according to the procedure just described. As indicated above, this displacement phase is driven by the planner, without the assistance of the three-dimensional vision system.

The controller can record data on the laying of each segment and possibly edit a laying report, which makes it possible to ensure the traceability of the production of the tunnel.

Advantageously, after placement of a complete ring of segments, the automated laying device is able to measure, thanks to the three-dimensional vision system, at least one geometric characteristic of said ring. This geometric characteristic can in particular be:
- the roll angle (to make sure that the bearing areas formed on the segments for the thrust cylinders are indeed opposite the cylinders of the tunnel-boring machine),
- the flatness of the front face of the ring (a lack of flatness of the front face of the ring being likely to involve variations in the thrust forces of the cylinders),
- the centering of the ring in the tunnel-boring machine skirt (this information is useful, on the one hand, to know the position of the ring in space, which is necessary to guide the tunnel-boring machine: the position of the shield being known in the reference frame of the guide system, the position of the ring relative to the skirt of the shield allows determining the position of the ring in the reference frame of the guide system and, on the other hand, to avoid any friction of the skirt on the rings),
- and/or the ovalization of the ring.

The control of these characteristics is useful insofar as it can affect the placement of the next ring and/or the operation of the tunnel-boring machine. Thus, for example, if the edges of the rings are aligned, a possible ovalization is likely to spread to the following rings. Similarly, a lack of flatness of the front face of the ring is likely to affect the front face of the next ring.

Advantageously, the measured characteristic(s) is/are therefore taken into account by the controller to adjust the laying plan of the next ring and thus compensate for any possible laying defects of the ring that has just been laid.

Moreover, said characteristics can be recorded with the laying report to ensure the traceability of the tunnel construction.

An advantage of the device which has just been described is that it allows accurately laying the set of the segments constituting a ring, including the two segments whose laying has a greater complexity, namely:
- the first segment of a ring, considering that there is not yet any adjacent segment, and
- the last segment (or key), which must be inserted between two segments previously laid.

In the case of the first segment of a ring, as indicated above, the scanning of the laying area by the erector equipped with a profilometer allows determining, via remarkable points and/or areas, the roll angle of the first segment relative to the last ring laid, and the controller can take into account this measurement to determine the segment laying path.

In the case of the last segment, the three-dimensional vision system allows the controller to determine the space available to mount the last segment, which, if it is too large or too small, can trigger an intervention of an operator.

The invention therefore makes it possible to successively lay several segments—or even several consecutive rings—without any human intervention in the erector working area, thereby minimizing the risks faced by the operators and the difficulty of their work.

Moreover, as previously indicated above, the automated device allows making the laying of the rings reliable and contributes to the traceability of the production of the tunnel by recording the laying plans actually made and the characteristics controlled on the rings laid.

REFERENCES

FR 2 745 327
CN104747213
JPH08-296400

The invention claimed is:

1. A device for automated picking up and laying of a segment forming a lining of a tunnel, configured to be coupled to a tunnel-boring machine provided with a segment erector, said erector comprising actuators equipped with position sensors, the device comprising:
- a controller configured to communicate with an automated system of the tunnel-boring machine adapted to control actuation of the erector, and to receive measurement data from the erector sensors,
- a three-dimensional vision system comprising at least four laser profilometers, configured to be attached to the erector so as to (i) determine a deviation in position and in inclination between the erector and a segment to be gripped and (ii) acquire a set of data analyzing the deviations in the position and inclination of a segment to be laid which is held by the erector relative to at least one segment and/or one ring of segments previously laid, said three-dimensional vision system being coupled to the controller to transmit said measurement data thereto,
- the controller being configured to receive a segment laying plan and, thanks to a computer planner adapted to process said analysis data of the three-dimensional vision system, the measurement data of the erector sensors and said laying plan, to determine a path of the erector in order to place said segment to be laid opposite said segment and/or ring of segments previously laid, and to communicate movement orders to the automated system of the tunnel-boring machine in order to actuate the erector to pick up the segment to be laid and displace it according to said path.

2. The device according to claim 1, further comprising a man-machine interface coupled to the controller.

3. The device according to claim 1, wherein the controller is configured to send, to the automated system of the tunnel-boring machine, orders to move at least one thrust cylinder of the tunnel-boring machine, to release an area for laying the segment to be laid and to secure said segment once it is in place.

4. The device according to claim 1, wherein the controller is configured to recognize, from the measurement data, a segment to be laid.

5. A tunnel-boring machine comprising a segment erector and a device according to claim 1.

6. A method for automated picking up and laying of a segment to form a lining of a tunnel, by a tunnel-boring machine provided with a segment erector and with an automated system adapted to control actuation of the erector, the method comprising:
- providing a device according to claim 1,
- placing the three-dimensional vision system on the erector,
- establishing a communication between the controller of said device and the automated system of the tunnel-boring machine,
- receiving, by the controller, a segment laying plan and measurement data from the sensors of the erector, communicating, by the controller to the automated system of the tunnel-boring machine, an order to grip the segment to be laid by the erector, gripping a segment to be laid by the erector, bringing said segment into a laying area defined by the controller, acquiring, by the three-dimensional vision system, data analyzing the deviations in the position and inclination of the segment to be laid relative to at least one segment and/or one ring of segments previously laid, processing said measurement data by the controller to determine, from said measurement data of the three-dimensional vision system, measurement data of the erector sensors and of said laying plan, a path of the erector in order to place said segment to be laid opposite said segment and/or ring of segments previously laid, communicating, by the controller, orders to move the erector to the automated system of the tunnel-boring machine, actuating the erector by the automated system according to said movement orders, to place the segment, communicating to the automated system, by the controller, orders to move at least one thrust cylinder of the tunnel-boring machine;

securing said segment by said thrust cylinder against a ring previously laid.

7. The method according to claim 6, further comprising, prior to the gripping of the segment to be laid, recognition of said segment by the controller from the data provided by the three-dimensional vision system.

8. The method according to claim 6, wherein, after the securing operation of the segment, the controller sends, to the automated system of the tunnel-boring machine, an order to release the gripping of the segment.

9. A method for the automated laying of a complete ring of segments, characterized in that the method according to claim 6 is implemented for a set of segments constituting said ring.

10. The method according to claim 9, further comprising, after the placement of a complete ring of segments, the measurement, by the three-dimensional vision system, of at least one geometric characteristic of said ring, comprising the roll angle, a flatness of the front face, a centering of the ring in the skirt of the tunnel-boring machine and/or an ovalization of the ring.

11. The method according to claim 10, wherein, according to said measurement of said geometrical characteristic of the ring, the controller adjusts the plan for laying the segments of the next ring.

* * * * *